United States Patent
Ryu et al.

(10) Patent No.: US 11,818,749 B2
(45) Date of Patent: Nov. 14, 2023

(54) TECHNIQUES FOR PRIORITY-BASED PREEMPTION OR CANCELLATION OF WIRELESS COMMUNICATIONS

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Franklin Park, NJ (US); Ling Ding, Chester, NJ (US); Jelena Damnjanovic, Del Mar, CA (US); Juan Montojo, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 17/150,927

(22) Filed: Jan. 15, 2021

(65) Prior Publication Data
US 2021/0266929 A1 Aug. 26, 2021

Related U.S. Application Data

(60) Provisional application No. 62/979,306, filed on Feb. 20, 2020.

(51) Int. Cl.
*H04W 72/12* (2023.01)
*H04W 72/566* (2023.01)

(52) U.S. Cl.
CPC .............. *H04W 72/566* (2023.01)

(58) Field of Classification Search
CPC ........... H04W 72/042; H04W 72/1284; H04W 72/0453; H04W 72/10; H04L 1/1854; H04L 5/0073
See application file for complete search history.

(56) References Cited

U.S. PATENT DOCUMENTS

| | | | |
|---|---|---|---|
| 11,395,313 B2* | 7/2022 | Bharadwaj | H04L 5/0055 |
| 11,627,585 B2 | 4/2023 | Hosseini et al. | |
| 2019/0306835 A1* | 10/2019 | Hoang | H04W 72/53 |
| 2020/0229198 A1* | 7/2020 | Kung | H04W 72/042 |
| 2020/0351057 A1* | 11/2020 | Yeo | H04W 72/02 |
| 2021/0050958 A1* | 2/2021 | Sarkis | H04L 5/0044 |
| 2021/0058877 A1* | 2/2021 | Wu | H04W 52/325 |

(Continued)

*Primary Examiner* — Romani Ohri
(74) *Attorney, Agent, or Firm* — ArentFox Schiff LLP

(57) ABSTRACT

Aspects described herein relate to preempting or cancelling sidelink or uplink communications, by a base station or a user equipment (UE). In an aspect, a base station can determine to schedule a first device to communicate, in first resources, sidelink communications having a first priority, determine to schedule a second device to transmit, in second resources, sidelink or uplink transmissions having a second priority, wherein the second resources overlap the first resources at least in a time domain, and transmit, based on the first priority and the second priority, an indication to the first or second device to preempt or cancel sidelink communications or uplink transmissions in associated resources. In another aspect, a UE can receive an indication to cancel sidelink transmission over sidelink resources previously scheduled for the sidelink transmission, and can refrain from the sidelink transmission over the sidelink resources.

28 Claims, 10 Drawing Sheets

(56) References Cited

U.S. PATENT DOCUMENTS

| | | | |
|---|---|---|---|
| 2021/0058938 A1* | 2/2021 | Hosseini | H04W 52/383 |
| 2021/0144750 A1* | 5/2021 | Cao | H04W 72/0453 |
| 2021/0153167 A1* | 5/2021 | Sarkis | H04W 72/20 |
| 2021/0227508 A1* | 7/2021 | Lee | H04W 74/006 |
| 2021/0307032 A1* | 9/2021 | Osawa | H04W 72/1263 |
| 2021/0392664 A1* | 12/2021 | Alabbasi | H04W 72/14 |
| 2022/0078650 A1* | 3/2022 | Lee | H04W 72/0446 |
| 2022/0174682 A1* | 6/2022 | Li | H04W 72/10 |

* cited by examiner

TECHNIQUES FOR PRIORITY-BASED PREEMPTION OR CANCELLATION OF WIRELESS COMMUNICATIONS

CLAIM OF PRIORITY UNDER 35 U.S.C. § 119

The present application for patent claims priority to Provisional Patent Application No. 62/979,306, entitled "TECHNIQUES FOR PRIORITY-BASED PREEMPTION OR CANCELLATION OF WIRELESS COMMUNICATIONS" filed Feb. 20, 2020, which is assigned to the assignee hereof and hereby expressly incorporated by reference herein for all purposes.

BACKGROUND

Aspects of the present disclosure relate generally to wireless communication systems, and more particularly, to prioritizing transmission of wireless communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In wireless communication technologies such as 5G NR, devices, such as user equipment (UEs), can communicate with a wireless network via base stations or gNB over an access link. The devices can also communicate with one another directly over a sidelink. In either case, the devices can use beamforming to transmit signals to the network or to other devices, such that the devices can selectively apply power to antenna resources to generate a beam in a desired spatial direction. In addition, the devices can be configured for different types or priorities of communications, such as URLLC and enhanced mobile broadband (eMBB).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communication is provided. The method includes determining to schedule a first device to communicate, in first resources, sidelink communications having a first priority, determining to schedule a second device to transmit, in second resources, sidelink or uplink transmissions having a second priority, wherein the second resources overlap the first resources at least in a time domain, and transmitting, based on the first priority and the second priority, at least one of a first indication to preempt or cancel sidelink communications in the first resources to the first device or a second indication to preempt or cancel sidelink or uplink transmissions in the second resources to the second device.

In another example, a method for wireless communication is provided. The method includes receiving, from a base station, an indication to cancel sidelink transmission over sidelink resources, wherein the sidelink resources are previously scheduled for the sidelink transmission, and refraining, based on the indication, from the sidelink transmission over the sidelink resources.

In another example, a method for wireless communication is provided. The method includes transmitting, to a base station, an indication or request to transmit high priority sidelink communications, receiving, from the base station, an indication of resources over which to transmit the high priority sidelink communications, and transmitting, to a user equipment (UE) over the resources in a sidelink channel, the high priority sidelink communications.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

In an example, an apparatus for wireless communication is provided that includes a transceiver, a memory configured to store instructions, and one or more processors communicatively coupled with the memory and the transceiver. The one or more processors are configured to determine to schedule a first device to communicate, in first resources, sidelink communications having a first priority, determine to schedule a second device to transmit, in second resources, sidelink or uplink transmissions having a second priority, wherein the second resources overlap the first resources at least in a time domain, and transmit, based on the first priority and the second priority, at least one of a first indication to preempt or cancel sidelink communications in the first resources to the first device or a second indication to preempt or cancel sidelink or uplink transmissions in the second resources to the second device.

In another example, an apparatus for wireless communication is provided that includes a transceiver, a memory configured to store instructions, and one or more processors communicatively coupled with the memory and the transceiver. The one or more processors are configured to receive, from a base station, an indication to cancel sidelink transmission over sidelink resources, wherein the sidelink resources are previously scheduled for the sidelink transmission, and refrain, based on the indication, from the sidelink transmission over the sidelink resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
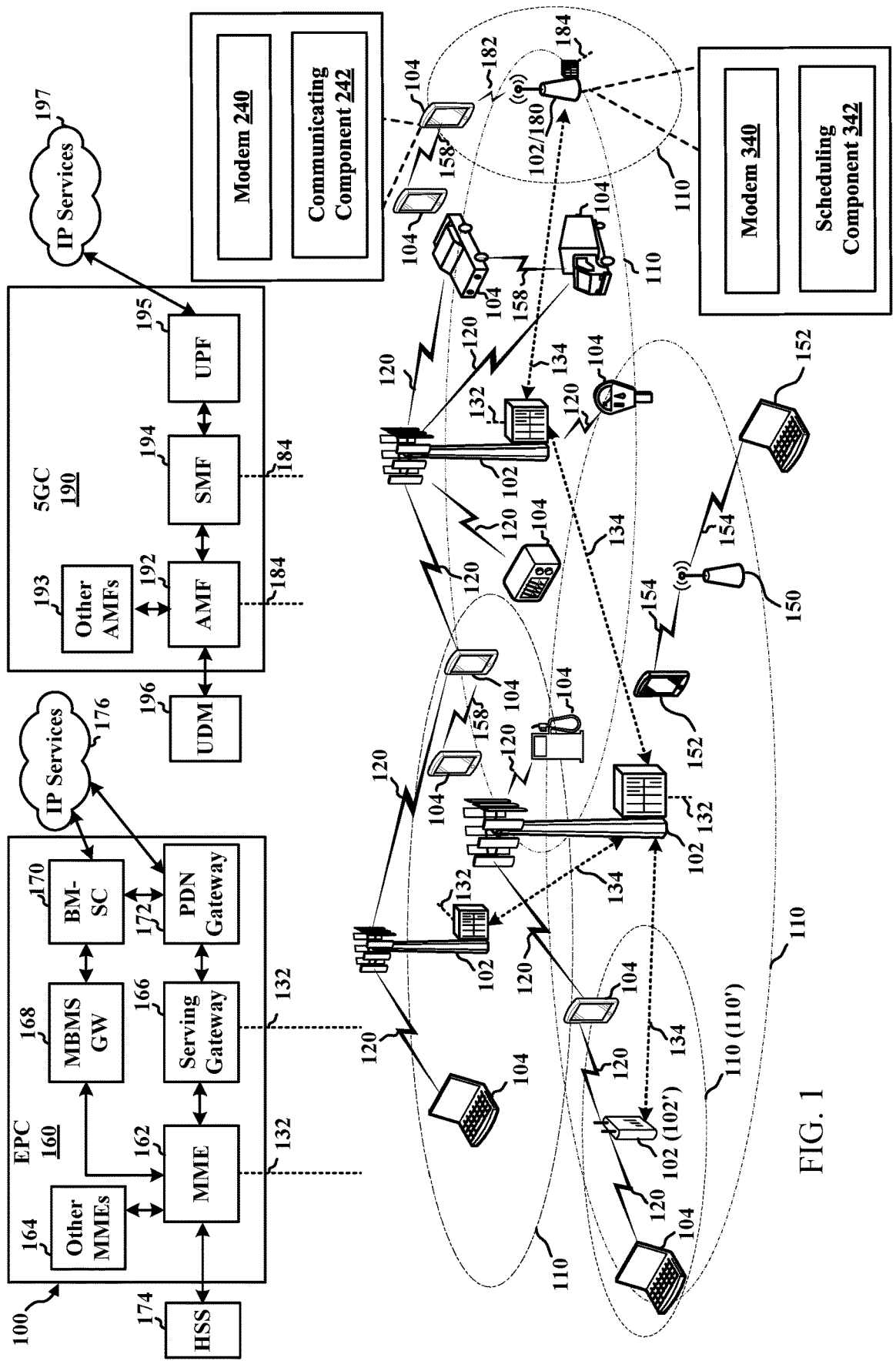
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to priority-based preemption or cancellation of wireless communications for one or more devices over a first link to facilitate wireless communications for the one or more devices over a second link. The first and second links may include one of an access link between the one or more devices and a network (e.g., between the one or more devices and a gNB), a sidelink directly between the one or more devices, etc. In an example, the network can determine to preempt or cancel communications over the first or second link and may notify one or more devices of the preemption or cancellation of corresponding resources. Moreover, the devices can include user equipment (UEs) or devices with a UE function, such as an integrated access and backhaul (IAB) node, etc. Moreover, the devices can utilize beamforming to communicate over the first link or the second link (e.g., over sidelinks). In addition, for example, the UEs can operate in mode 1 operation mode for sidelink where the gNB manages scheduling and other aspects of the sidelink communications.

In an example, the devices can use different types of communications that may have different associated priorities, quality-of-service (QoS) requirements, and/or the like. Examples of different types of communications can include ultra-reliable-low latency communications (URLLC), enhanced mobile broadband (eMBB), etc. In addition, in time division duplexing (TDD), a gNB can schedule uplink (UL) transmissions from the UE to gNB and sidelink transmissions from UE to another UE (e.g., in mode 1 operation, as described where gNB schedules sidelink (SL) activities). For example, the gNB can schedule the UL transmissions in UL slots and/or sidelink transmissions in SL slots in TDD. In the context of high priority traffic and SL (and TDD), there are multiple scenarios where some communications may be preempted or cancelled to allow other communications. For example, UL high priority traffic may arrive that is to be transmitted in resources scheduled for SL traffic. In another example, sidelink high priority traffic may arrive that is to be transmitted in resources scheduled for UL traffic. In another example, sidelink high priority traffic may arrive that is to be transmitted in resources scheduled for normal or low priority (e.g., non-urgent) sidelink traffic. Aspects described herein relate to prioritizing the high priority traffic (e.g., URLLC traffic) over the resources, which may include preempting or cancelling other traffic for which the resources are initially scheduled.

For example, a network device that provides access to the wireless network (e.g., a gNB) can determine that a first device is scheduled to communicate sidelink communications and a second device is scheduled to communicate uplink or sidelink communications in similar time resources. The network device can accordingly determine whether to prioritize the communications of the first device or the second device, and can accordingly transmit an indication to preempt or cancel communications over the already scheduled resources to the other of the first device or the second device. This can ensure that transmission of high priority communications (e.g., URLLC) are favored in the wireless network.

The described features will be presented in more detail below with reference to FIGS. 1-10.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for communicating with other UEs over a sidelink, communicating with a base station/gNB over an access link, requesting or indicating resources for high priority sidelink communications, etc., in accordance with aspects described herein, and some nodes may have a modem 340 and scheduling component 342 for prioritizing high priority communications by preempting or cancelling other communications, in accordance with aspects described herein. Though a UE 104 is shown as having the modem 240 and communicating component 242 and a base station 102/gNB 180 is shown as having the modem 340 and scheduling component 342, this is one illustrative example, and substantially any node or type of node may include a modem 240 and communicating component 242 and/or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 of a UE 104 can communicate with other UEs over a sidelink, communicate with a gNB over an access link, request or indicate resources for high priority sidelink communications, etc. In addition, for example, scheduling component 342 can determine to prioritize high priority communications from one or more UEs 104 and can accordingly preempt or cancel communications from other UEs 104 in overlapping resources. For example, scheduling component 342 can determine that a UE 104 is using resources to transmit high priority (e.g., URLLC) communications (e.g., whether over a sidelink or access link) and can accordingly preempt or cancel lower priority (e.g., eMBB) communications of other UEs 104 (e.g., whether over a sidelink or access link) to allow the high priority communications. In another example, communicating component 242 can indicate or request resources for transmitting high priority sidelink communications, and scheduling component 342 can determine that the UE 104 uses the resources to transmit the high priority sidelink communications based on the indication or request. In this example, scheduling component 342 can grant the resources to the UE 104 for the high priority sidelink communications and/or can cancel/preempt overlapping resources of other UEs.

Figure 2:
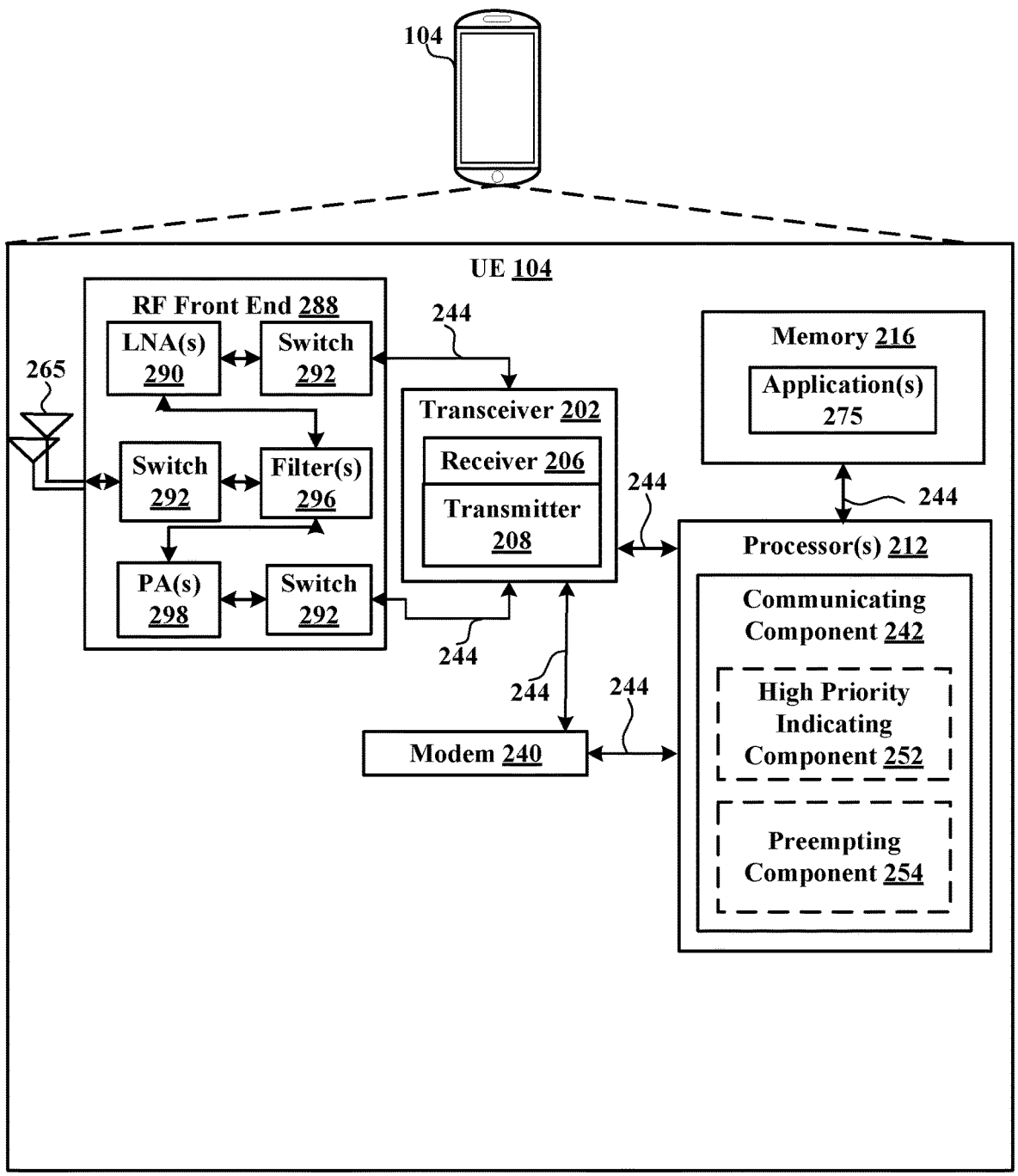
FIG. 2 is a block diagram illustrating an example of a UE, in accordance with various aspects of the present disclosure.
Figure 3:
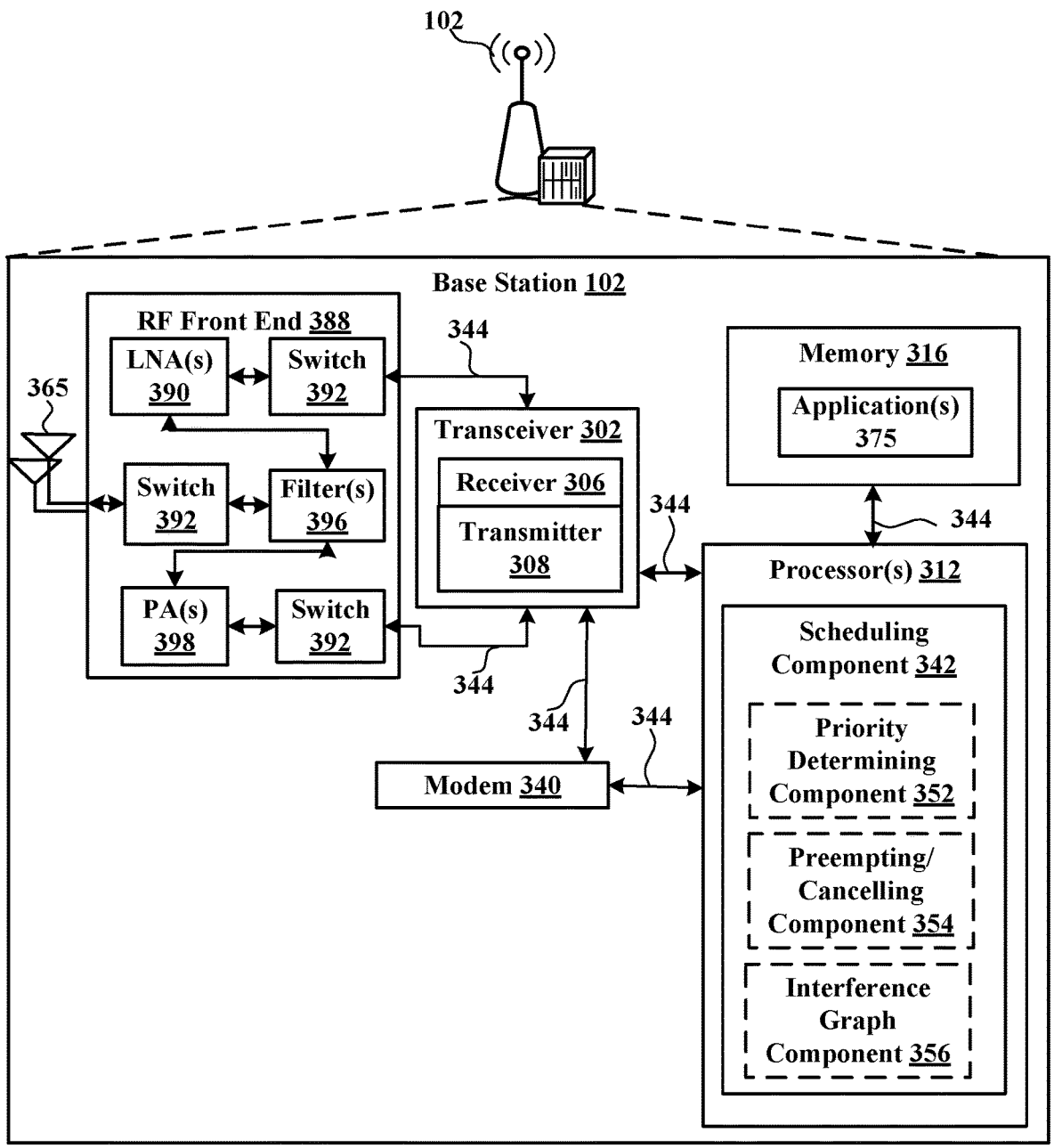
FIG. 3 is a block diagram illustrating an example of a base station, in accordance with various aspects of the present disclosure.
Figure 4:
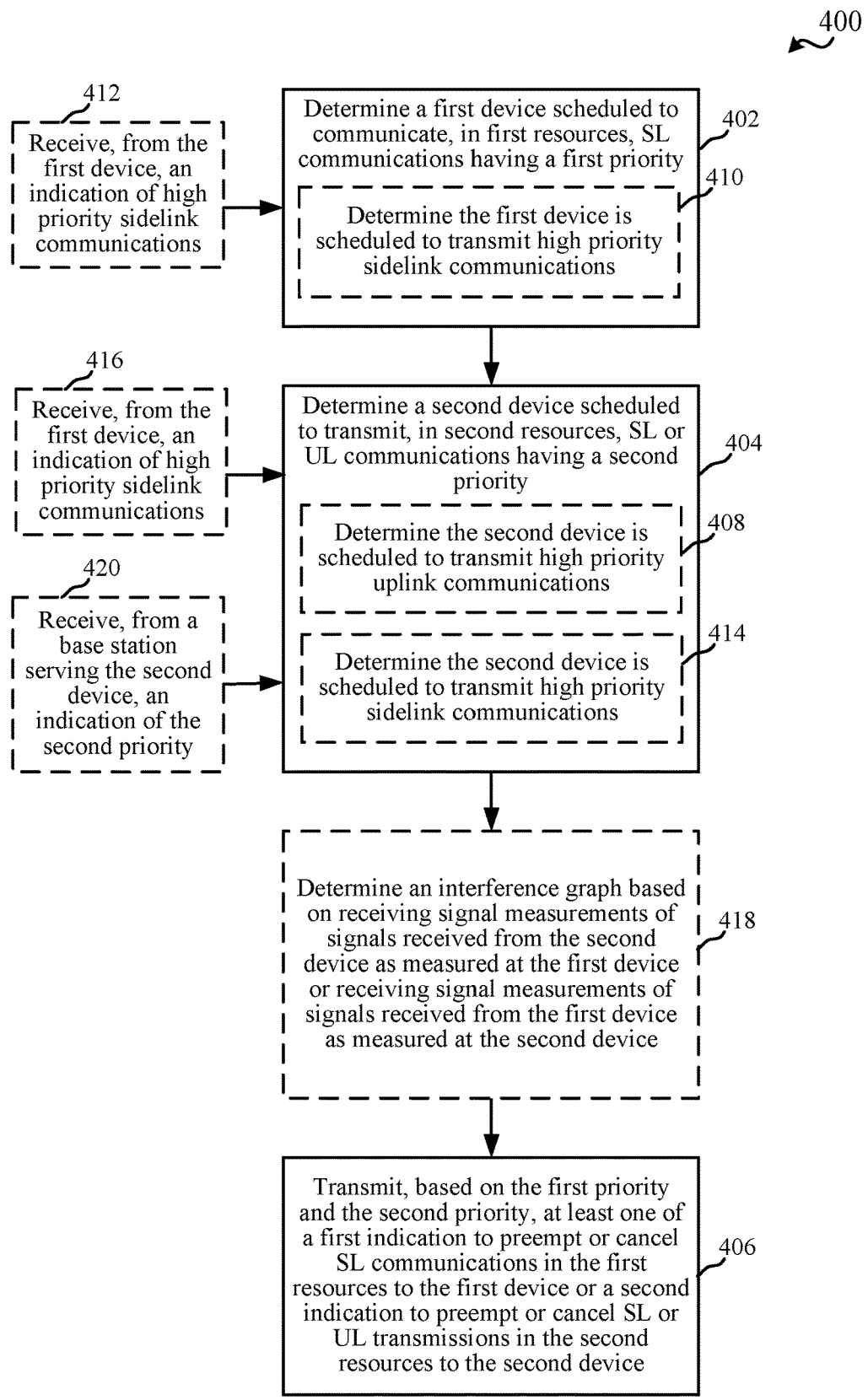
FIG. 4 is a flow chart illustrating an example of a method for preempting or cancelling communications, in accordance with various aspects of the present disclosure.
Figure 6:
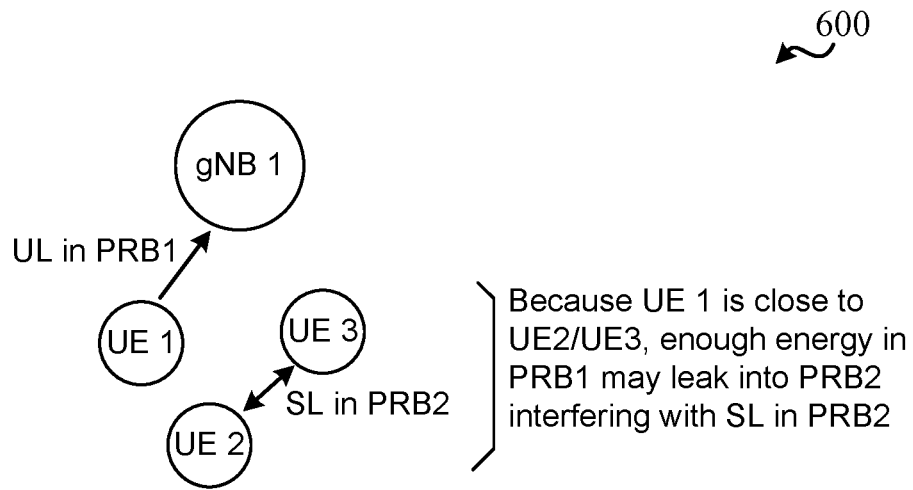
FIG. 6 illustrates examples of systems with different scenarios for preempting or cancelling communications for devices using adjacent resource blocks, in accordance with various aspects of the present disclosure.
Figure 6:
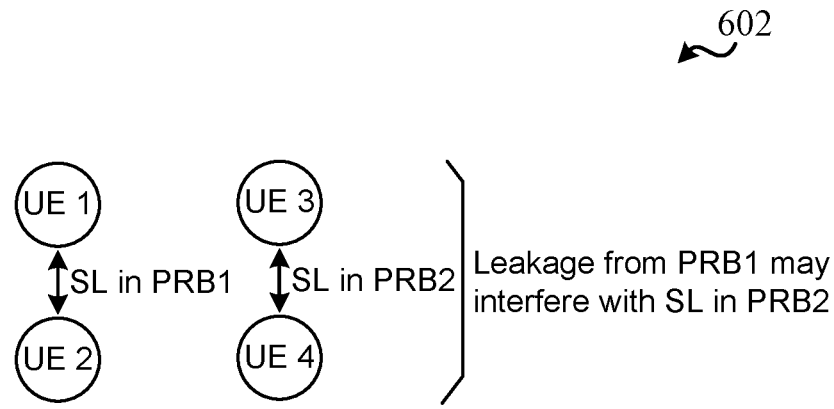
Figure 7:
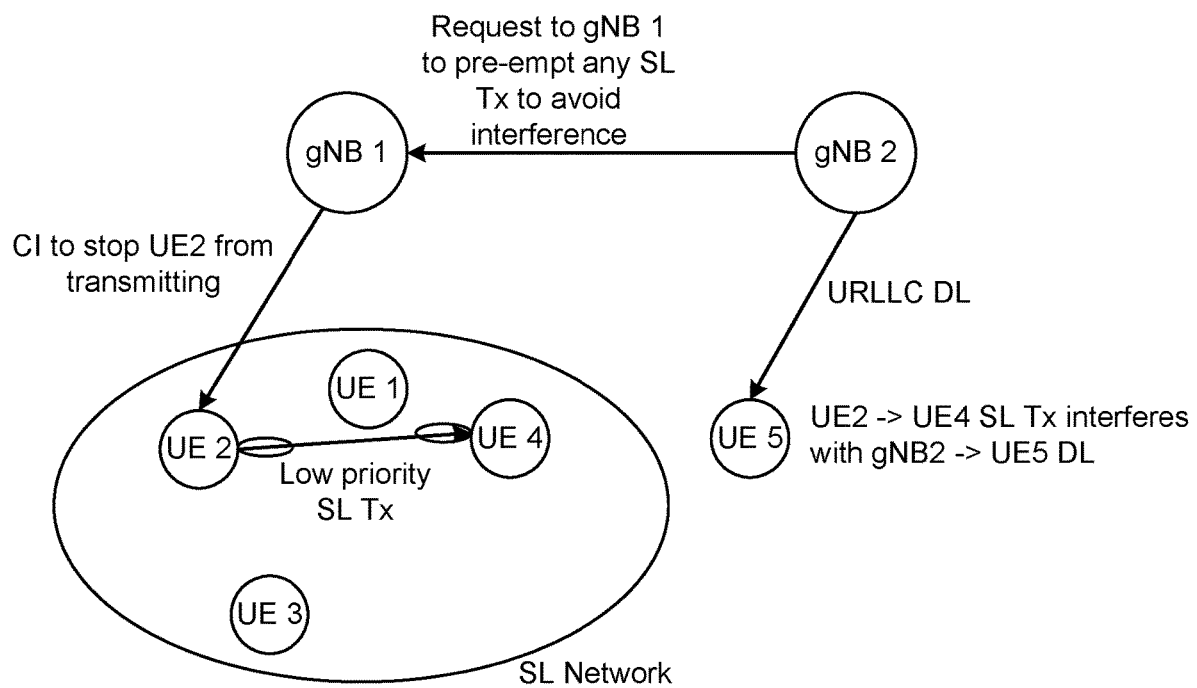
FIG. 7 illustrates examples of systems with different scenarios for preempting or cancelling communications of devices served by different base stations, in accordance with various aspects of the present disclosure.
Figure 8:
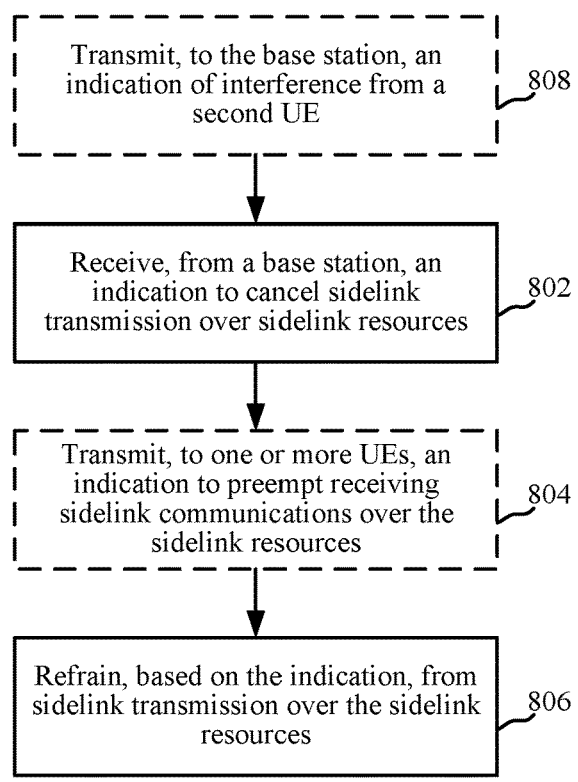
FIG. 8 is a flow chart illustrating an example of a method for receiving a cancellation indication, in accordance with various aspects of the present disclosure.
Figure 9:
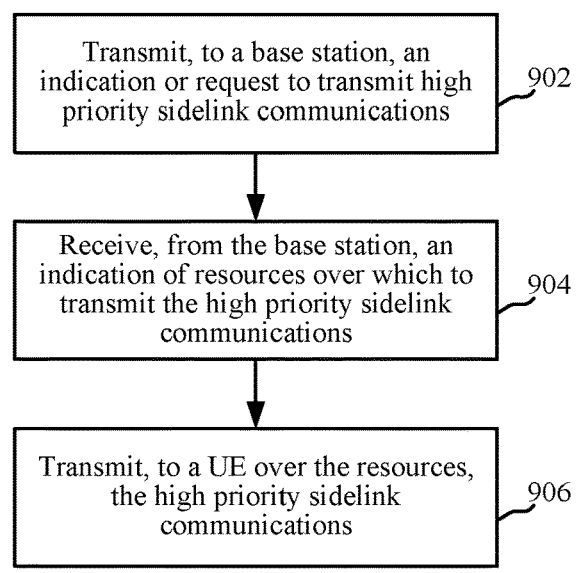
FIG. 9 is a flow chart illustrating an example of a method for indicating or requesting to transmit high priority sidelink communications, in accordance with various aspects of the present disclosure.

Turning now to FIGS. 2-10, aspects are depicted with reference to one or more components and one or more methods that may perform the actions or operations described herein, where aspects in dashed line may be optional. Although the operations described below in FIGS. 4, 8, and 9 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for communicating with other UEs over a sidelink, communicating with a gNB over an access link, requesting or indicating resources for high priority sidelink communications, etc., as described further herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a high priority indicating component 252 for indicating or requesting resources for transmitting high priority sidelink communications, and/or a preempting component 254 for transmitting an indication to preempt resources scheduled for sidelink reception, as described further herein.

In an aspect, the processor(s) 212 may correspond to one or more of the processors described in connection with the UE in FIG. 10. Similarly, the memory 216 may correspond to the memory described in connection with the UE in FIG. 10.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and scheduling component 342 for prioritizing high priority communications by preempting or cancelling other communications, as described further herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, scheduling component 342 can optionally include a priority determining component 352 for determining a priority of communications from one or more UEs over an access link or sidelink, a preempting/cancelling component 354 for preempting and/or cancelling communications of one or more UEs (or corresponding scheduled resources) to allow high priority communications of another UE, and/or an interference graph component 356 for generating an interference graph representing possible interference between or among communications of various UEs, as described further herein.

In an aspect, the processor(s) 312 may correspond to one or more of the processors described in connection with the base station in FIG. 10. Similarly, the memory 316 may correspond to the memory described in connection with the base station in FIG. 10.

FIG. 4 illustrates a flow chart of an example of a method 400 for priority-based preemption or cancellation of wireless communications. In an example, a base station 102/gNB 180 can perform the functions described in method 400 using one or more of the components described in FIGS. 1 and 3. Though aspects are described generally in terms of a base station 102 performing the functions, a gNB 180 can be the base station 102 or can otherwise be similarly configured to perform the functions described herein.

In method 400, at Block 402, a first device scheduled to communicate, in first resources, SL communications having a first priority can be determined. In an aspect, priority determining component 352, e.g., in conjunction with processor(s) 312, memory 316, transceiver 302, scheduling component 342, etc., can determine the first device scheduled to communicate, in first resources, SL communications having a first priority. For example, scheduling component 342 can determine to schedule the first device, which can include scheduling the first resources for the communications for the first device, as sidelink communications can be in mode 1 operation where the base station 102 schedules the UEs for sidelink communications. In this regard, for example, priority determining component 352 can determine the first resources and the first priority based on resources scheduled for the first device by scheduling component 342. For example, scheduling component 342 can determine the first device scheduled based on a SL scheduling grant transmitted to first second device, where the scheduling grant can indicate the second resources (e.g., in frequency and/or time) over which the second device can transmit or receive SL communications. In addition, for example, priority determining component 352 can determine the first resources as being resources to transmit or receive sidelink communications.

In addition, for example, priority determining component 352 can determine the first resources as a portion of frequency (e.g., one or more subcarriers) over a portion of time (e.g., one or more orthogonal frequency division multiplexing (OFDM) symbols, single carrier frequency division multiplexing (SC-FDM) symbols, etc., one or more slots of multiple symbols, and/or the like). In another example, priority determining component 352 can determine the first resources as either the portion of frequency or the portion of time. In one example, the first resources can correspond to one or more resource blocks (RBs), which can include one or more resource elements (REs) including multiple subcarriers over the portion of time (e.g., a transmission time interval (TTI), which can be the one or more symbols, one or more slots of multiple symbols, etc.).

In method 400, at Block 404, a second device scheduled to transmit, in second resources, SL or UL communications having a second priority can be determined. In an aspect, priority determining component 352, e.g., in conjunction with processor(s) 312, memory 316, transceiver 302, scheduling component 342, etc., can determine the second device scheduled to transmit, in second resources, SL or UL communications having a second priority. For example, scheduling component 342 can determine to schedule the first device, which can include scheduling the second resources for transmission by the second device (e.g., as sidelink communications in mode 1 operation, or as uplink communications to the base station 102). In this regard, for example, priority determining component 352 can determine the second resources and the second priority based on resources scheduled for the second device by scheduling component 342. For example, scheduling component 342 can determine the second device scheduled based on a SL or UL scheduling grant transmitted to the second device, where the scheduling grant can indicate the second resources (e.g., in frequency and/or time) over which the second device can transmit or receive SL communications or transmit UL communications.

In addition, for example, priority determining component 352 can determine the second resources as a portion of frequency (e.g., one or more subcarriers) over a portion of time (e.g., one or more OFDM symbols, SC-FDM symbols, etc., one or more slots of multiple symbols, and/or the like). In another example, priority determining component 352 can determine the second resources as either the portion of frequency or the portion of time. In one example, the second resources can correspond to one or more RBs. Moreover, for example, the first resources and the second resources can at least partially overlap in time and/or in frequency (or may be close enough in frequency to be subject to interference from adjacent channel leakage (ACL)), such that communications over the first resources and the second resource may interfere with one another. Accordingly, as described in various examples herein, one of the sidelink communications over the first resources or the sidelink or uplink transmissions over the second resources can be preempted or cancelled based on a priority of the communications and/or based on the possibility of interference between the communications. In this regard, the high priority communications can be allowed and/or interference possibly caused by lower priority communications can be mitigated.

In method 400, at Block 406, at least one of a first indication to preempt or cancel sidelink communications in the first resources can be transmitted, based on the first priority and the second priority, to the first device or a second indication to preempt or cancel sidelink or uplink transmissions in the second resources can be transmitted, based on the first priority and the second priority, to the second device. In an aspect, preempting/cancelling component 354, e.g., in conjunction with processor(s) 312, memory 316, transceiver 302, scheduling component 342, etc., can transmit, based on the first priority and the second priority, at least one of the first indication to preempt or cancel sidelink communications in the first resources to the first device or the second indication to preempt or cancel sidelink or uplink transmissions in the second resources to the second device. As described, preempting/cancelling component 354 can transmit the first indication or the second indication based on corresponding priorities of the communications to prioritize a highest priority communication over the first or second resources. In one example, the first device, based on receiving the first indication, can refrain from communicating over the first resources (e.g., sidelink resources) or can otherwise ignore a previous resource grant sent to the first device for communicating over the first resources. In another example, the second device, based on receiving the second indication, can refrain from transmitting over the second resources (e.g., sidelink or uplink resources) or can otherwise ignore a previous resource grant sent to the second device for communicating over the second resources. Various examples of receiving the indications and accordingly refraining from communications are described herein.

In an example, preempting/cancelling component 354 can transmit the first indication or the second indication, or determine to transmit the first indication or the second indication, based on a level of interference between the first device and the second device. In one example, the level of interference can be determined based on signal measurements received from the first device of signals transmitted by the second device, signal measurements received from the second device of signals transmitted by the first device, etc., as described herein. In an example, this information may be stored in an interference graph which can be generated to represent the level of interference between various devices, as described herein.

In addition, for example, preempting/cancelling component 354 can transmit the first indication or the second indication based on determining that the first resources and the second resources at least partially overlap in time and/or frequency. In one example, preempting/cancelling component 354 can transmit the first indication or the second indication based on determining that the first resources and the second resources at least partially overlap in time and are close enough in frequency to potentially cause interference, such as in adjacent frequency channels or PRBs, within a threshold span or difference in frequency (e.g., within a threshold span or difference in frequency channel number, PRB index, and/or the like), etc. For example, when a device transmits a signal in a PRB (e.g., PRB 1), the transmit power is not confined within PRB 1, as some transmit power leaks into adjacent PRBs. Adjacent channel leakage may not be desirable as this is interference to reception in adjacent PRBs by any nearby receiver devices. In access link communications, this may not be a concern, as UEs are all transmitting to a base station in UL slot, or all receiving from the base station in DL slot. In sidelink communications, however, a device can transmit or receive in a given slot. In addition, in sidelink, devices can be very close in proximity, so adjacent channel leakage from one device transmitting in one PRB can be received at high enough power by another nearby device receiving in adjacent PRB such to cause interference.

In this regard, for example, high priority transmission in one PRB may interfere with SL activity in adjacent PRB. In an example, cross PRB leakage interference is possible even though URLLC and SL are in different PRBs, because of the close proximity of the SL devices and energy leakage from one PRB to another PRB. For example, when UL URLLC (in PRB1) preempts SL activity (in an adjacent PRB due to channel leakage) or when SL URLLC (in PRB1) preempts another SL activity (in an adjacent PRB due to channel leakage), preempting/cancelling component 354 can generate Preemption Indicator (PI)/Cancellation Indicator (CI) (e.g., as it does for examples where UL URLLC and SL activity are in the same PRB as described above). In one example, preempting/cancelling component 354 can transmit the first indication or the second indication for preempting/cancelling sidelink communications for UL URLLC communications as the transmit power for UL is sufficient to cause adjacent channel leakage (e.g., based on typically larger separation distance between the device and base station). An example is shown in FIG. 6.

FIG. 6 illustrates an example of a system 600 for preempting or cancelling sidelink communications between UE2 and UE3 over resources where UE1 transmits UL URLLC to a gNB. Though UE1 may use a different PRB (PRB1) for UL URLLC than UE2 and UE3 use for SL communications (PRB2), because UE1 is close enough to UE2 and/or UE3 (and where PRB1 and PRB2 are adjacent in frequency or within a threshold span of frequency), enough energy from the transmission of UE1 may leak into PRB2 to cause interference for the SL communication. In this example, preempting/cancelling component 354 can send PI to the SL device whose reception in one PRB may be interfered by adjacent channel leakage from UL URLLC transmission from another device in another PRB (e.g., UE2 or UE3), and/or may also send CI to the corresponding SL device transmitting the SL communications in the one PRB (e.g., UE3 or UE2) to reduce the adjacent channel interference on the reception of UL URLLC at gNb. In this example, preempting/cancelling component 354 can send PI or CI based on determining that UE1 and UE2 or UE3 are scheduled in PRBs that are adjacent in frequency (or within a threshold span of frequency), based on determining that UE1 and UE2 or UE3 are possibly subject to interference from one another (e.g., based on a received indication of interference, an interference graph, as described further herein, based on beams used by the UEs, etc.), and/or the like.

Similarly, in one example, preempting/cancelling component 354 can transmit the first indication or the second indication for preempting/cancelling other sidelink communications for SL URLLC communications as the transmit power for SL may be sufficient to cause adjacent channel leakage to nearby sidelink devices not receiving the SL URLLC communications. An example is shown in FIG. 6.

FIG. 6 illustrates an example of a system 602 for preempting or cancelling sidelink communications between UE3 and UE4 over resources where UE1 transmits SL URLLC to UE2. Though UE1 and UE2 may use a different PRB (PRB1) for SL URLLC than UE3 and UE4 use for SL communications (PRB2), because UE1 and/or UE2 are close enough to UE3 and/or UE4 (and where PRB1 and PRB2 are adjacent or within a threshold span of frequency), enough energy from the transmission of UE3 or UE4 may leak into PRB 1 to cause interference for the SL URLLC communication of UE1. For example, preempting/cancelling component 354 can send PI to the SL device whose reception in one PRB may be interfered by ACL from SL URLLC transmission from another device in another PRB (e.g., UE3 or UE4), and/or may send CI to the corresponding SL device transmitting the SL communications in the one PRB (e.g., UE4 or UE3) to reduce the ACL from SL transmission to SL URLLC reception. In another example, however, PC/CI may not be needed for UL communications in adjacent resources to SL URLLC communications, as the transmit power for SL may not cause significant adjacent channel leakage to a device transmitting UL communications to a base station.

Moreover, for example, preempting/cancelling component 354 can transmit the first indication or the second indication to multiple devices, as described further herein. For example, preempting/cancelling component 354 can transmit a PI/CI to one or more devices (e.g., all nodes) having resources that at least partially overlap resources used for high priority URLLC traffic.

In a specific example, the first or second indication can be a PI or CI as defined for use in 5G NR access link communications. For example, in access link, there can be at least two priorities of traffic, which may include eMBB access (e.g., typical access DL/UL traffic) and URLLC access (e.g., higher priority than eMBB access). Because of low latency requirement, for example, URLLC traffic can be transmitted as soon as the data arrives at the source, where the source can be the base station 102 for downlink or UE 104 for uplink. When DL URLLC is to be transmitted by the base station, the base station 102 can stop eMBB DL transmission in overlapping resources and instead transmit DL URLLC. In this example, the base station 102 can transmit downlink control information (DCI) of DCI format 2_1 as a PI to notify a group of UEs of the physical RB(s) (PRB(s)) and OFDM symbol(s) where UEs may assume no transmission is intended for the UEs. Said differently, this can provide a way for the base station 102 to inform one or more UEs that they were scheduled to receive downlink communications in resources, but the base station 102 did not transmit downlink communications in those resources because of some urgent URLLC traffic to prevent the UEs from trying to decode signals received in its scheduled DL resources. In another example, a first UE is scheduled to transmit uplink communications in UL resources, but a second UE has UL URLLC to transmit in overlapping resources, the base station 102 can schedule the second UE for UL URLLC in at least the overlapping resources and can inform the first UE, via a CI, that its UL resources are cancelled. As described herein, preempting/cancelling component 354 can utilize similar PI/CI to preempt or cancel sidelink communications of the first device or sidelink or uplink transmissions of the second device.

In determining the second device at Block 404, optionally at Block 408, it can be determined that the second device is scheduled to transmit high priority uplink communications. In an aspect, priority determining component 352, e.g., in conjunction with processor(s) 312, memory 316, transceiver 302, scheduling component 342, etc., can determine the second device is scheduled to transmit high priority uplink communications. For example, priority determining component 352 can determine that the second priority of the uplink communications for transmitting in the second resources is higher than the first priority of the sidelink communications of the first device. In one example, priority determining component 352 can determine that the second priority corresponds to URLLC communications. In this example, preempting/cancelling component 354 can determine to preempt or cancel the first resources for sidelink communications of the first device to allow the UL URLLC transmission by the second device over the second resources. Accordingly in this example, e.g., at Block 406, preempting/cancelling component 354 can determine to transmit, based on the first priority and the second priority (e.g., based on determining the second priority as higher than the first priority), the first indication to preempt or cancel SL communications in the first resources to the first device.

In this example, high priority UL URLLC traffic from a UE to base station 102 can be prioritized. Where the UL URLLC traffic is to be scheduled during SL resource, the UL URLLC can preempt or cancel SL activity, such that the base station 102 can transmit indications (e.g., PI) to one or more UEs scheduled to receive sidelink communications in resources overlapping the UL URLLC traffic and/or can transmit indications (e.g., CI) to one or more UEs scheduled to transmit sidelink communications in resources overlapping the UL URLLC traffic. In one example, preempting/cancelling component 354 can transmit PI/CI to all SL nodes sharing the same resource as (or at least overlapping) UL URLLC traffic (e.g., CI to each SL transmitter UE to stop SL transmission and prevent potential interference at the base station 102, PI to each SL receiver UE, which can be from either gNb or SL Tx UE whose SL transmission was cancelled by CI). In this example, preempting/cancelling component 354 may potentially transmit many PIs and/or CIs. As described in further examples herein, the preempting/cancelling component 354 may reduce the number of PIs and/or CIs by sending only to nodes that are interfered by (or potentially interfered by) the UL URLLC transmission or to nodes that create interference to the UL URLLC. In an example, nodes that create interference to the UL URLLC can be determined based on a level of interference determined between the UEs (e.g., determined based on an interference graph) and/or determining what beams are used to transmit UL URLLC and SL. A specific example is shown in FIG. 5.

Figure 5:
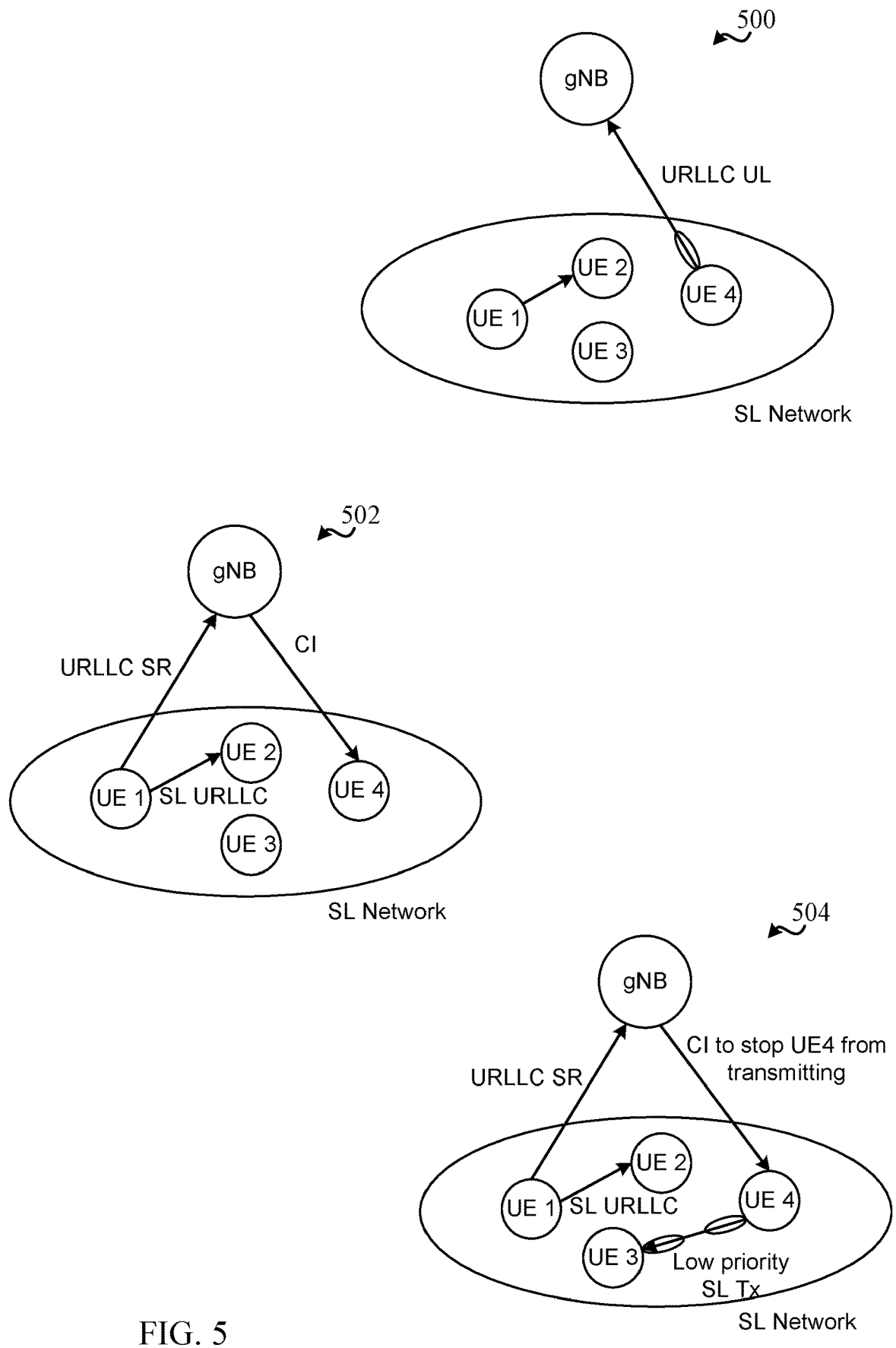
FIG. 5 illustrates examples of systems with different scenarios for preempting or cancelling communications, in accordance with various aspects of the present disclosure.

FIG. 5 illustrates various examples of systems where sidelink and/or uplink communications by devices that can be preempted or cancelled as described herein. In system 500, UE1, UE2, UE3, and UE4 can communicate in a sidelink network. In this specific example, UE4 can be scheduled to transmit UL URLLC to gNB and while UE1 is scheduled to transmit SL communications (e.g., to UE2 or generally to multiple UEs) in overlapping resources. In this example, the gNB may determine to transmit a CI to UE1 if it determines that UE1 SL communications may interfere with UE4 UL URLLC communications to the gNB, and/or may transmit a PI to UE2 if it determines that UE2 receiving the SL communications from UE1 may be interfered by UE4 UL URLLC transmission. In another example, however, gNB may determine that the SL communications of UE1 and UL URLLC transmission of UE4 do not interfere (e.g., based on a level of interference between UE1 and UE4, which may be determined from an interference graph, a distance between UE1 and UE4, beams used by UE1 or UE4 in transmitting respective communications, or other parameters) and may not send a PI/CI.

In determining the first device at Block 404, optionally at Block 410, it can be determined that the first device is scheduled to transmit high priority sidelink communications. In an aspect, priority determining component 352, e.g., in conjunction with processor(s) 312, memory 316, transceiver 302, scheduling component 342, etc., can determine the first device is scheduled to transmit high priority sidelink communications. For example, priority determining component 352 can determine that the first priority of the sidelink communications for transmitting in the first resources is higher than the second priority of the uplink or sidelink transmission of the second device. In one example, priority determining component 352 can determine that the first priority corresponds to URLLC transmission over the sidelink. In this example, preempting/cancelling component 354 can determine to preempt or cancel the second resources for sidelink or uplink transmission of the second device to allow the SL URLLC transmission by the first device over the first resources. Accordingly in this example, e.g., at Block 406, preempting/cancelling component 354 can determine to transmit, based on the first priority and the second priority (e.g., based on determining the first priority as higher than the second priority), the second indication to preempt or cancel SL or UL transmissions in the second resources to the second device.

In this example, sidelink URLLC from one UE can preempt access link communications of other UEs (e.g., preempt transmitting UL eMBB or other lower priority communications). In an example, the base station 102 can schedule sidelink URLLC for the UE and preempting/cancelling component 354 can accordingly determine to transmit CI to other UEs scheduled for UL transmission in overlapping resources. For example, transmitting the CI to cancel UL transmission can prevent interference to sidelink URLLC. In addition, in an example, preempting/cancelling component 354 can determine to transmit CIs be based on at least one of a SL interference graph, a scheduling of UL resources, a transmit beam used for UL, one or more receive beams used for SL URLLC, etc. It may be possible, that the uplink transmit beam for uplink communications is not aligned (e.g., in space) with SL URLLC Rx beam, and thus may not cause interference. Thus, for example, transmitting the CI may not be necessary at least in some cases. A specific example is shown in FIG. 5.

In FIG. 5, system 502 includes UE1, UE2, UE3, and UE4 that can communicate in a sidelink network. In this specific example, UE4 can be scheduled to transmit UL communications to gNB and while UE1 is scheduled to transmit SL URLLC communications (e.g., to UE2 or generally to multiple UEs) in overlapping resources. In this example, the gNB may determine to transmit a CI to UE4 to cancel the UL transmission over corresponding resources if it determines that UE4 UL communications may interfere with UE1 SL URLLC communications. In another example, however, gNB may determine that the UL communications of UE4 and SL URLLC transmission of UE1 do not interfere (e.g., based on an interference graph, a distance between UE1 and UE4, beams used by UE1 or UE4 in transmitting respective communications, beams used by other UEs to receive the SL communications from UE1, or other parameters) and may not send a CI to UE4.

In one example, in method 400, optionally at Block 412, an indication of high priority sidelink communications can be received from the first device. In an aspect, priority determining component 352, e.g., in conjunction with processor(s) 312, memory 316, transceiver 302, scheduling component 342, etc., can receive, from the first device, the indication of high priority sidelink communications. For example, the first device can transmit, and priority determining component 352 can receive, an indication or request for high priority sidelink resources.

In one example, the first device can transmit, and priority determining component 352 can receive, a scheduling request (SR) for high priority sidelink communications (e.g., SL URLLC SR). In this example, the first device can transmit, and priority determining component 352 can receive, the SR over resources of a control channel (e.g., physical uplink control channel (PUCCH)). In addition, the SR may indicate a priority, amount of resources, deadline for transmitting, etc. related to the SL URLLC communications, and priority determining component 352 can provide high priority sidelink resources grants to the first device based on the SR and/or related amount of resources, deadline, etc. In another example, the first device can transmit, and priority determining component 352 can receive, a buffer status report (BSR) corresponding to high priority sidelink communications. For example, the BSR can correspond to a logical channel or logical channel group that can map to a priority (which can have been previously configured), and priority determining component 352 can provide high priority sidelink resources grants to the first device based on the BSR (and/or can issue corresponding PI/CI, as described). In either example, priority determining component 352 can determine the first priority of the first resources based on receiving the SL URLLC SR, the BSR, or based on scheduling component 342 correspondingly scheduling SL URLLC resources to the first device based on the SL URLLC SR, the BSR, etc.

In determining the second device at Block 404, optionally at Block 414, it can be determined that the second device is scheduled to transmit high priority sidelink communications. In an aspect, priority determining component 352, e.g., in conjunction with processor(s) 312, memory 316, transceiver 302, scheduling component 342, etc., can determine the second device is scheduled to transmit high priority sidelink communications. For example, priority determining component 352 can determine that the second priority of the sidelink communications for transmitting in the second resources is higher than the first priority of the sidelink communications of the first device. In one example, priority determining component 352 can determine that the second priority corresponds to URLLC transmission over the sidelink. In this example, preempting/cancelling component 354 can determine to preempt or cancel the first resources for sidelink communications of the first device to allow the SL URLLC transmission by the second device over the second resources. Accordingly in this example, e.g., at Block 406, preempting/cancelling component 354 can determine to transmit, based on the first priority and the second priority (e.g., based on determining the second priority as higher than the first priority), the first indication to preempt or cancel SL communications in the first resources to the first device.

In this example, sidelink URLLC can preempt another sidelink. For example, preempting/cancelling component 354 can send PI/CI to one or more (e.g., all) SL nodes having resources for SL communications that overlap those of the SL URLLC traffic. In one example, as described further herein, preempting/cancelling component 354 can determine to preempt or cancel communications based on whether the resources for other UEs are in the same (e.g. at least partially overlapping in frequency) and/or adjacent frequency channels that may be subject to adjacent channel leakage and/or whether the resources are in the same or similar time periods. In an example, the base station 102 can schedule sidelink URLLC for one UE and preempting/cancelling component 354 can correspondingly transmit PI/CI to other UEs. For example, preempting/cancelling component 354 can transmit CI to stop sidelink transmission and prevent interference to sidelink URLLC and can transmit PI to sidelink receiver UEs. As described above, for example, PI can be either from the base station 102 or transmitted by a SL Tx UE whose transmission got cancelled by CI. As described in further examples herein, the preempting/cancelling component 354 may reduce the number of PIs and/or CIs by sending only to nodes that are interfered by (or potentially interfered by) the UL URLLC transmission or only to nodes that create interference to the UL URLLC reception, which can be based on an interference graph and/or determining what beams are used to transmit UL URLLC and SL. A specific example is shown in FIG. 5.

In FIG. 5, system 504, UE1, UE2, UE3, and UE4 can communicate in a sidelink network. In this specific example, UE4 can be scheduled to transmit SL communications to UE3 (and/or other UEs) while UE1 is scheduled to transmit SL URLLC communications (e.g., to UE2 or generally to multiple UEs) in overlapping resources that overlap in time and/or overlap (or are adjacent or within a threshold span) in frequency. In this example, the gNB may determine to transmit a CI to UE4 to cancel the SL transmission or corresponding resources if it determines that UE4 SL communications may interfere with UE1 SL URLLC communications. In another example, however, gNB may determine that the SL communications of UE4 and SL URLLC transmission of UE1 do not interfere (e.g., based on an interference graph, a distance between UE1 and UE4, beams used by UE1 or UE4 in transmitting respective communications, beams used by other UEs to receive the SL communications from UE1, or other parameters) and may not send a CI to UE4.

In one example, in method 400, optionally at Block 416, an indication of high priority sidelink communications can be received from the second device. In an aspect, priority determining component 352, e.g., in conjunction with processor(s) 312, memory 316, transceiver 302, scheduling component 342, etc., can receive, from the second device, the indication of high priority sidelink communications. For example, the second device can transmit, and priority determining component 352 can receive, an indication or request for high priority sidelink resources.

In one example, the second device can transmit, and priority determining component 352 can receive, a SR for high priority sidelink communications (e.g., SL URLLC SR). In this example, the second device can transmit, and priority determining component 352 can receive, the SR over resources of a control channel (e.g., PUCCH). In addition, the SR may indicate a priority, amount of resources, deadline for transmitting, etc. related to the SL URLLC communications, and priority determining component 352 can provide high priority sidelink resources grants to the second device based on the SR and/or related amount of resources, deadline, etc., as described. In another example, the second device can transmit, and priority determining component 352 can receive, a BSR corresponding to high priority sidelink communications. For example, the BSR can correspond to a logical channel or logical channel group that can map to a priority (which can have been previously configured), and priority determining component 352 can provide high priority sidelink resources grants to the second device based on the BSR (and/or can issue corresponding PI/CI, as described). In either example, priority determining component 352 can determine the second priority of second resources as high priority based on receiving the SL URLLC SR, the BSR, or based on scheduling component 342 correspondingly scheduling SL URLLC resources to the second device based on the SL URLLC SR, the BSR, etc.

In method 400, optionally at Block 418, an interference graph can be determined that is based on receiving signal measurements of signals received from the second device as measured at the first device or receiving signal measurements of signals received from the first device as measured at the second device. In an aspect, interference graph component 356, e.g., in conjunction with processor(s) 312, memory 316, transceiver 302, scheduling component 342, etc., can determine the interference graph based on receiving signal measurements of signals received from the second device as measured at the first device or receiving signal measurements of signals received from the first device as measured at the second device. For example, interference graph component 356 can request the devices to measure signals received from other devices and report the measurements, and can receive the measurement from the devices for associating in the interference graph, or for storing an indication of interference between devices in the interference graph where a reported signal measurement achieves a threshold. In an example, the devices can provide an indication of the measurement of the received signals and/or an indication of interference where the measurement achieves a threshold.

For example, the signal measurement can include a reference signal received power (RSRP) measured of a reference signal transmitted by a device. Interference graph component 356, for example, can request the second device to transmit a channel state information reference signal (CSI-RS), or other signal, the second device can transmit the signal (e.g., at power P), and the first device can measure RSRP of the CSI-RS from the second device. In addition, the second device can transmit the CSI-RS using a known or configured transmit beam, and the first device can attempt to receive and measure the CSI-RS using a receive beam. In this example, the first device can know whenever the second device transmits any signal at power P using a certain transmit beam and the first device uses a certain receive beam, the first device can receive the signal at the measured RSRP. If the signal transmitted by the second device is unwanted signal, that is interference to the first device.

In one example, the first device can also indicate a receive beam used by the first device and/or a transmit beam used by the second device to the base station 102 to facilitate indicating beam information in the interference graph, where the beams causing the devices to be subject to interference can be determined. In another example, the second device can indicate the transmit beam. In yet another example, the base station 102 can configure the transmit and receive beams for the devices, and can know the transmit and receive beam pair for which interference is reported by the first device. In any case, interference graph component 356 may associate beam pair information with indicated interference, such that preempting/cancelling component 354 can determine to preempt or cancel communications where the devices are scheduled to transmit using beam pairs that may cause interference and/or are scheduled in overlapping time periods, frequencies that are overlapping, adjacent, or within a threshold span, etc.

Interference graph component 356 can generate the interference graph based on the received RSRP measurements to capture this interference relation between pairs of devices as measured and reported. In addition, preempting/cancelling component 354 can determine to transmit the first or second indication based on whether the first device and second device are indicated, in the interference graph, as a pair of devices whose signals may interfere one another (e.g., for a given set of one or more beams or otherwise). In addition, in one example, the interference graph may also account for interference caused by adjacent channel leakage.

In another example, the second device can be served by a different base station, but PI/CI can still be transmitted to potentially preempt and/or cancel communications of the first device in favor of communications by the second device. In this regard, in method 400, optionally at Block 420, an indication of the second priority can be received from a base station serving the second device. In an aspect, priority determining component 352, e.g., in conjunction with processor(s) 312, memory 316, transceiver 302, scheduling component 342, etc., can receive, from a base station serving the second device, an indication of the second priority. For example, where the second priority is higher than the first priority and the second resources are overlapping the first resources for the first device, preempting/cancelling component 354 can transmit the first indication to the first device to preempt/cancel sidelink communications in the first resources, as described above. An example is illustrated in FIG. 7.

FIG. 7 illustrates an example of a system 700 where UE1, UE2, UE3, and UE4 can communicate in a sidelink network 1 under control of gNB1 (e.g., where gNB1 can schedule sidelink resources for the sidelink network). In addition, in system 700, gNB2 can communicate with UE5, which can be nearby UEs in sidelink network 1 such that communications of UE5 and communications in sidelink network 1 may interfere with one another in overlapping resources. In this example, gNB1 is using an UL slot, symbol, or other time division for SL activity, and gNB2 is in DL slot, symbol, etc. that overlaps the UL slot of gNB1, and intends to transmit URLLC in some resource within the DL slot. In this example, gNB2 can request gNB1 to issue PI/CI in the same time and/or frequency resource as URLLC in gNB2's cell. For example, gNB2 can indicate, and priority determining component 352 can receive, the URLLC priority of the communications to be transmitted to UE5 to the gNB1 to request the gNB1 to preempt or cancel sidelink transmission to avoid interference. gNB1 can accordingly send PI/CI to any SL device within the same time and/or frequency resources as gNB2's URLLC DL, as described above, to preempt or cancel sidelink transmission and/or reception in these resources to avoid interference.

FIG. 8 illustrates a flow chart of an example of a method 800 for receiving a cancellation indication to cancel sidelink transmissions. In an example, a UE 104 can perform the functions described in method 800 using one or more of the components described in FIGS. 1-2.

In method 800, at Block 802, an indication to cancel sidelink transmission over sidelink resources can be received from a base station. In an aspect, preempting component 254, e.g., in conjunction with processor(s) 212, memory 216, transceiver 202, communicating component 242, etc., can receive, from the base station (e.g., base station 102 that is serving the UE 104), the indication to cancel sidelink transmission over sidelink resources. For example, the indication can be a cancellation indicator, as described above, which can be received based on the base station 102 determining to cancel resources related to the sidelink transmission to allow a higher priority uplink transmission from another UE. The base station 102 can have previously scheduled resources to the UE 104 for transmitting the sidelink communications (e.g., based on a SR, BSR, etc.), but can later cancel the resources, in this regard, by transmitting the cancellation indicator to the UE 104.

In method 800, optionally at Block 804, an indication to preempt receiving sidelink communications over the sidelink resources can be transmitted to one or more UEs. In an aspect, preempting component 254, e.g., in conjunction with processor(s) 212, memory 216, transceiver 202, communicating component 242, etc., can transmit, to one or more UEs, the indication to preempt receiving sidelink communications over the sidelink resources. For example, transmission of the indication, which can be a preemption indicator as described above, can be based on receiving the cancellation indicator. In this example, the UE 104 can assist in further preempting the resources over which sidelink reception of the sidelink transmission was scheduled to one or more UEs. This can allow the base station 102 to receive the higher priority uplink transmission from the other UE without the one or more UEs receiving the uplink transmission over the sidelink resources. In another example, as described, the base station 102 may additionally or alternatively transmit the indication to the one or more UEs to preempt receiving the sidelink communications.

In method 800, at Block 806, sidelink transmission over the sidelink resources can be refrained from based on the indication. In an aspect, communicating component 242, e.g., in conjunction with processor(s) 212, memory 216, transceiver 202, etc., can refrain, based on the indication, from sidelink transmission over the sidelink resources. In this regard, the UE 104 does not transmit the originally scheduled sidelink communications over the previously scheduled sidelink resources, as described herein.

In method 800, optionally at Block 808, an indication of interference from a second UE can be transmitted to the base station. In an aspect, communicating component 242, e.g., in conjunction with processor(s) 212, memory 216, transceiver 202, etc., can transmit, to the base station, the indication of interference from the second UE. For example, communicating component 242 can detect the interference from the second UE based on receiving and measuring signals transmitted by the second UE, such as CSI-RS, as described above. In this example, communicating component 242 can transmit an indication of a signal measurement of the CSI-RS to the base station, or can transmit an indication of interference based on comparing the signal measurement to a threshold, etc. In addition, in an example, communicating component 242 can indicate a beam used to receive the signal from the second UE. As described, this can allow the base station 102 to avoid scheduling the UE 104 for sidelink communications (or cancel sidelink transmissions) where the second UE is scheduled for higher priority uplink or sidelink transmissions in similar resources. Thus, for example, receiving an indication to cancel sidelink transmission over sidelink resources at Block 802 can be received based on the indication of interference.

FIG. 9 illustrates a flow chart of an example of a method 900 for sending an indication or request to transmit high priority sidelink communications. In an example, a UE 104 can perform the functions described in method 900 using one or more of the components described in FIGS. 1-2.

In method 900, at Block 902, an indication or request to transmit high priority sidelink communications can be transmitted to a base station. In an aspect, high priority indicating component 252, e.g., in conjunction with processor(s) 212, memory 216, transceiver 202, communicating component 242, etc., can transmit, to the base station (e.g., base station 102 serving UE 104), an indication or request to transmit high priority sidelink communications. For example, the indication may correspond to high priority sidelink communications, such as SL URLLC. In an example, the indication may be a SR (e.g., transmitted over a PUCCH) that requests scheduling of resources for a certain channel, where the channel can be associated with SL URLLC communications. The SR may also indicate the priority, an amount of resources requested, a deadline by which the communication is to be transmitted or other parameters from which priority can be inferred and/or from which an amount of resources or timing of scheduling resources can be determined by the base station 102. In another example, the indication may be a BSR that indicates the buffer status of a logical channel or logical channel group, where the logical channel or logical channel group map to high priority (e.g., URLLC) communications.

In method 900, at Block 904, an indication of resources over which to transmit the high priority sidelink communications can be received. In an aspect, communicating component 242, e.g., in conjunction with processor(s) 212, memory 216, transceiver 202, etc., can receive, from the base station, the indication of resources over which to transmit the high priority sidelink communications. For example, the indication can be a resource grant received from the base station 102 to schedule resources so the UE 104 can transmit sidelink communications.

In method 900, at Block 906, the high priority sidelink communications can be transmitted to a UE over the resources. In an aspect, communicating component 242, e.g., in conjunction with processor(s) 212, memory 216, transceiver 202, etc., can transmit, to the UE (e.g., another UE) over the resources, the high priority sidelink communications.

Figure 10:
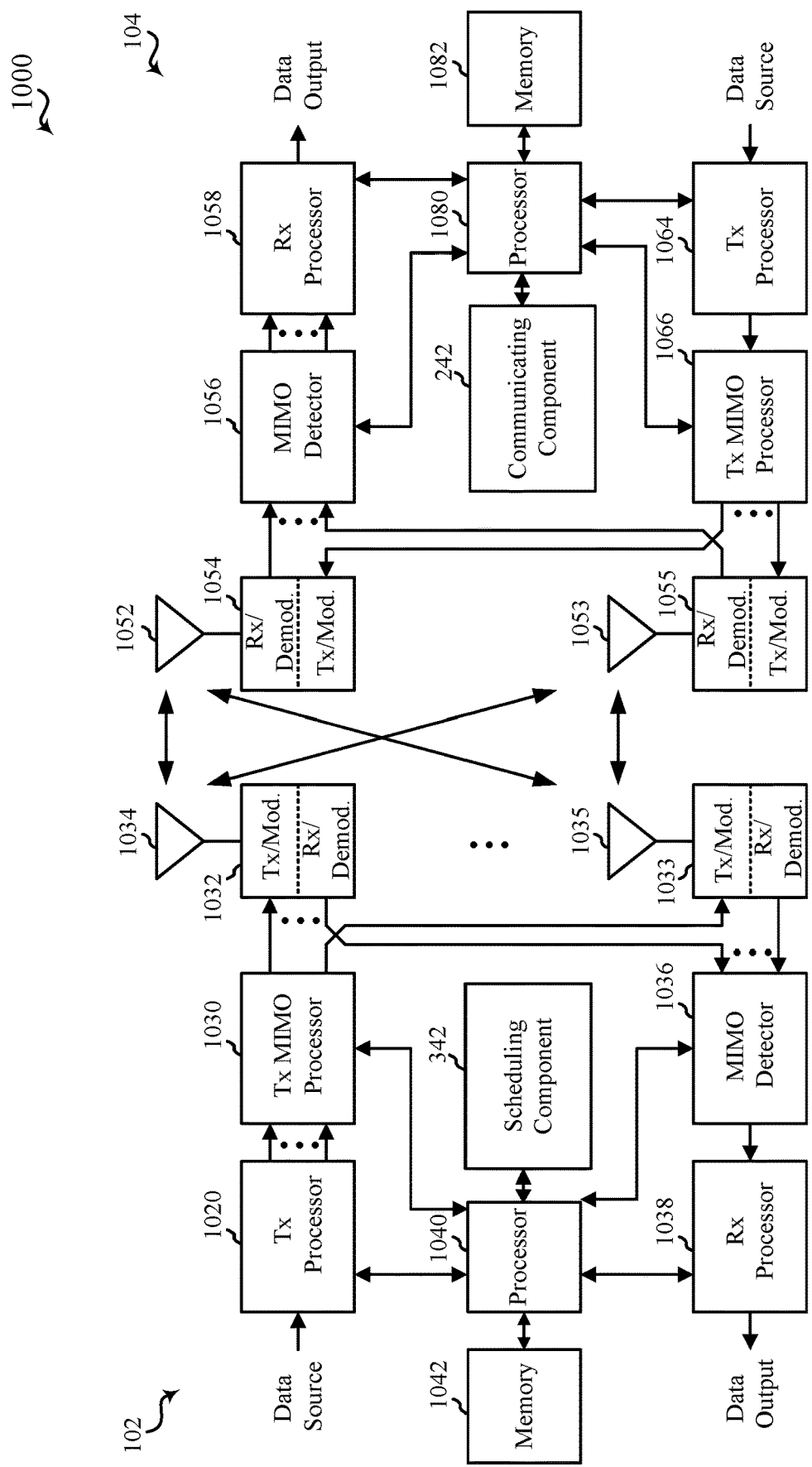
FIG. 10 is a block diagram illustrating an example of a MIMO communication system including a base station and a UE, in accordance with various aspects of the present disclosure.

FIG. 10 is a block diagram of a MIMO communication system 1000 including a base station 102 and a UE 104. The MIMO communication system 1000 may illustrate aspects of the wireless communication access network 100 described with reference to FIG. 1. The base station 102 may be an example of aspects of the base station 102 described with reference to FIG. 1. The base station 102 may be equipped with antennas 1034 and 1035, and the UE 104 may be equipped with antennas 1052 and 1053. In the MIMO communication system 1000, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1020 may receive data from a data source. The transmit processor 1020 may process the data. The transmit processor 1020 may also generate control symbols or reference symbols. A transmit MIMO processor 1030 may perform spatial processing (e.g., precoding) on data symbols, control symbols, or reference symbols, if applicable, and may provide output symbol streams to the transmit modulator/demodulators 1032 and 1033. Each modulator/demodulator 1032 through 1033 may process a respective output symbol stream (e.g., for OFDM, etc.) to obtain an output sample stream. Each modulator/demodulator 1032 through 1033 may further process (e.g., convert to analog, amplify, filter, and upconvert) the output sample stream to obtain a DL signal. In one example, DL signals from modulator/demodulators 1032 and 1033 may be transmitted via the antennas 1034 and 1035, respectively.

The UE 104 may be an example of aspects of the UEs 104 described with reference to FIGS. 1-2. At the UE 104, the UE antennas 1052 and 1053 may receive the DL signals from the base station 102 and may provide the received signals to the modulator/demodulators 1054 and 1055, respectively. Each modulator/demodulator 1054 through 1055 may condition (e.g., filter, amplify, downconvert, and digitize) a respective received signal to obtain input samples. Each modulator/demodulator 1054 through 1055 may further process the input samples (e.g., for OFDM, etc.) to obtain received symbols. A MIMO detector 1056 may obtain received symbols from the modulator/demodulators 1054 and 1055, perform MIMO detection on the received symbols, if applicable, and provide detected symbols. A receive (Rx) processor 1058 may process (e.g., demodulate, deinterleave, and decode) the detected symbols, providing decoded data for the UE 104 to a data output, and provide decoded control information to a processor 1080, or memory 1082.

The processor 1080 may in some cases execute stored instructions to instantiate a communicating component 242 (see e.g., FIGS. 1 and 2).

On the uplink (UL), at the UE 104, a transmit processor 1064 may receive and process data from a data source. The transmit processor 1064 may also generate reference symbols for a reference signal. The symbols from the transmit processor 1064 may be precoded by a transmit MIMO processor 1066 if applicable, further processed by the modulator/demodulators 1054 and 1055 (e.g., for SC-FDMA, etc.), and be transmitted to the base station 102 in accordance with the communication parameters received from the base station 102. At the base station 102, the UL signals from the UE 104 may be received by the antennas 1034 and 1035, processed by the modulator/demodulators 1032 and 1033, detected by a MIMO detector 1036 if applicable, and further processed by a receive processor 1038. The receive processor 1038 may provide decoded data to a data output and to the processor 1040 or memory 1042.

The processor 1040 may in some cases execute stored instructions to instantiate a scheduling component 342 (see e.g., FIGS. 1 and 3).

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 1000. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 1000.

The following aspects are illustrative only and aspects thereof may be combined with aspects of other embodiments or teaching described herein, without limitation.

Aspect 1 is a method for wireless communication including determining a first device scheduled to communicate, in first resources, sidelink communications having a first priority, determining a second device scheduled to transmit, in second resources, sidelink or uplink transmissions having a second priority, wherein the second resources overlap the first resources at least in a time domain, and transmitting, based on the first priority and the second priority, at least one of a first indication to preempt or cancel sidelink communications in the first resources to the first device or a second indication to preempt or cancel sidelink or uplink transmissions in the second resources to the second device.

In Aspect 2, the method of Aspect 1 includes wherein determining the second device scheduled to transmit in the second resources includes determining the second device is scheduled to transmit high priority uplink transmissions, and wherein transmitting at least one of the first indication or the second indication includes transmitting, to the first device, the first indication to preempt receiving sidelink communications or to cancel transmitting sidelink communications in the first resources.

In Aspect 3, the method of any of Aspects 1 or 2 includes wherein determining the second device scheduled to transmit in the second resources includes determining the second device is scheduled to transmit high priority sidelink transmissions, and wherein transmitting at least one of the first indication or the second indication includes transmitting, to the first device, the first indication to preempt receiving sidelink communications or to cancel transmitting sidelink communications in the first resources.

In Aspect 4, the method of any of Aspects 1 to 3 includes wherein determining the first device scheduled to communicate in the first resources includes determining the first device is scheduled to transmit high priority sidelink transmissions, and wherein transmitting at least one of the first indication or the second indication includes transmitting, to the second device, the second indication to cancel transmitting uplink communications in the second resources.

In Aspect 5, the method of any of Aspects 1 to 4 includes wherein determining the first device scheduled to communicate in the first resources is based at least in part on receiving, from the first device, a high priority sidelink scheduling request.

In Aspect 6, the method of any of Aspects 1 to 5 includes wherein determining the first device scheduled to communicate in the first resources is based at least in part on receiving, from the first device, a buffer status report for the sidelink communications.

In Aspect 7, the method of any of Aspects 1 to 6 includes wherein transmitting at least one of the first indication or the second indication is based on an interference graph that indicates a level of interference related to at least the first device and the second device.

In Aspect 8, the method of Aspect 7 includes determining the level of interference based on an interference graph that indicates the level of interference between the first device and the second device.

In Aspect 9, the method of Aspect 8 includes generating the interference graph based at least in part on at least one of receiving, from the first device, signal measurements of signals received from the second device as measured at the first device or receiving, from the second device, signal measurements of signals received from the first device as measured at the second device.

In Aspect 10, the method of any of Aspects 1 to 9 includes wherein transmitting at least one of the first indication or the second indication is further based on determining that the first resources and the second resources overlap in frequency or are subject to cross-frequency interference.

In Aspect 11, the method of any of Aspects 1 to 10 includes receiving an indication of the second priority from a base station serving the second device includes wherein transmitting at least one of the first indication or the second indication includes transmitting, to the first device and based on receiving the second priority from the base station, the first indication to preempt receiving sidelink communications or to cancel transmitting sidelink communications in the first resources.

Aspect 12 is a method for wireless communication including receiving, from a base station, an indication to cancel sidelink transmission over sidelink resources includes wherein the sidelink resources are previously scheduled for the sidelink transmission, and refraining, based on the indication, from the sidelink transmission over the sidelink resources.

In Aspect 13, the method of Aspect 12 includes transmitting, based on the indication and to one or more UEs, an indication to preempt receiving the sidelink transmission over the sidelink resources.

Aspect 14 is a method for wireless communication including transmitting, to a base station, an indication or request to transmit high priority sidelink communications, receiving, from the base station, an indication of resources over which to transmit the high priority sidelink communications, and transmitting, to a UE over the resources in a sidelink channel, the high priority sidelink communications.

In Aspect 15, the method of Aspect 14 includes wherein the indication is a high priority sidelink communication scheduling request.

In Aspect 16, the method of any of Aspects 14 or 15 includes wherein the indication is a buffer status report of a buffer for the high priority sidelink communications.

Aspect 17 is an apparatus for wireless communication including a transceiver, a memory configured to store instructions, and one or more processors communicatively coupled with the memory and the transceiver. The one or more processors are configured to perform one or more of the methods of any of Aspects 1 to 16.

Aspect 18 is an apparatus for wireless communication including means for performing one or more of the methods of any of Aspects 1 to 16.

Aspect 19 is a computer-readable medium including code executable by one or more processors for wireless communications, the code including code for performing one or more of the methods of any of Aspects 1 to 16.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, comprising:
scheduling a first device to communicate, in first resources, first sidelink communications having a first priority;
scheduling a second device to transmit, in second resources, second sidelink or uplink transmissions having a second priority, wherein the second resources overlap the first resources at least in a time domain; and transmitting, by a base station, based on determining that a second beam configured for the second device for transmitting the second sidelink or uplink transmissions in the second resources may cause interference to a first beam configured for the first device for transmitting or receiving the first sidelink communications in the first resources, and based on the first priority and the second priority, at least one of a first indication to preempt or cancel the first sidelink communications in the first resources to the first device or a second indication to preempt or cancel the second sidelink or uplink transmissions in the second resources to the second device.

2. The method of claim 1, wherein scheduling the second device to transmit in the second resources includes scheduling the second device to transmit high priority uplink transmissions, and wherein transmitting at least one of the first indication or the second indication includes transmitting, to the first device, the first indication to preempt receiving the first sidelink communications or to cancel transmitting the first sidelink communications in the first resources.

3. The method of claim 1, wherein scheduling the second device to transmit in the second resources includes scheduling the second device to transmit high priority sidelink transmissions, and wherein transmitting at least one of the first indication or the second indication includes transmitting, to the first device, the first indication to preempt receiving the first sidelink communications or to cancel transmitting the first sidelink communications in the first resources.

4. The method of claim 1, wherein scheduling the first device to communicate in the first resources includes scheduling the first device to transmit high priority sidelink transmissions, and wherein transmitting at least one of the first indication or the second indication includes transmitting, to the second device, the second indication to cancel transmitting uplink communications in the second resources.

5. The method of claim 1, wherein scheduling the first device to communicate in the first resources is based at least in part on receiving, from the first device, a high priority sidelink scheduling request.

6. The method of claim 1, wherein scheduling the first device to communicate in the first resources is based at least in part on receiving, from the first device, a buffer status report for the first sidelink communications.

7. The method of claim 1, wherein transmitting at least one of the first indication or the second indication is based on a level of interference related to at least the first device and the second device.

8. The method of claim 7, further comprising determining the level of interference based on an interference graph that indicates the level of interference between the first device and the second device.

9. The method of claim 8, further comprising generating the interference graph based at least in part on at least one of receiving, from the first device, signal measurements of signals received from the second device as measured at the first device or receiving, from the second device, signal measurements of signals received from the first device as measured at the second device.

10. The method of claim 1, wherein transmitting at least one of the first indication or the second indication is further based on determining that the first resources and the second resources overlap in frequency or are subject to cross-frequency interference.

11. The method of claim 1, further comprising receiving an indication of the second priority from a base station serving the second device, wherein transmitting at least one of the first indication or the second indication includes transmitting, to the first device and based on receiving the second priority from the base station, the first indication to preempt receiving the first sidelink communications or to cancel transmitting the first sidelink communications in the first resources.

12. A method for wireless communication, comprising:
transmitting, by a user equipment (UE) and to a base station, a first indication of interference from a second UE, wherein the first indication of interference identifies a beam over which the interference from the second UE occurs;
receiving, by the UE transmitting the first indication of interference to the base station, and based on a second beam configured for a second UE for transmitting sidelink or uplink communications in second resources causing interference to a first beam configured for the UE in sidelink resources, a second indication to cancel sidelink transmission over sidelink resources, wherein the sidelink resources are previously scheduled for the sidelink transmission; and
refraining, by the UE and based on the second indication, from the sidelink transmission over the sidelink resources.

13. The method of claim 12, further comprising transmitting, by the UE to one or more other UEs and based on the first indication to cancel sidelink transmission, a third indication to preempt receiving the sidelink transmission over the sidelink resources.

14. The method of claim 12, wherein the first indication of interference is based on measuring a signal received from the second UE in a frequency of the sidelink resources.

15. The method of claim 12, further comprising:
transmitting, to the base station, a request to transmit high priority sidelink communications;
receiving, from the base station, a third indication of resources over which to transmit the high priority sidelink communications; and
transmitting, to one or more UEs over the resources in a sidelink channel, the high priority sidelink communications.

16. The method of claim 15, wherein the request is a high priority sidelink communication scheduling request.

17. The method of claim 15, wherein the request is a buffer status report of a buffer for the high priority sidelink communications.

18. An apparatus for wireless communication, comprising:
a transceiver;
a memory configured to store instructions; and
one or more processors communicatively coupled with the memory and the transceiver, wherein the one or more processors are configured to:
schedule first device to communicate, in first resources, first sidelink communications having a first priority;
schedule second device to transmit, in second resources, second sidelink or uplink transmissions having a second priority, wherein the second resources overlap the first resources at least in a time domain; and
transmit, based on determining that a second beam configured for the second device for transmitting the second sidelink or uplink transmissions in the second resources may cause interference to a first beam configured for the first device for transmitting or receiving the first sidelink communications in the first resources and based on the first priority and the second priority, at least one of a first indication to preempt or cancel the first sidelink communications in the first resources to the first device or a second indication to preempt or cancel the second sidelink or uplink transmissions in the second resources to the second device.

19. The apparatus of claim 18, wherein the one or more processors are configured to schedule the second device to transmit in the second resources at least in part by scheduling the second device to transmit high priority uplink transmissions, and wherein the one or more processors are configured to transmit at least one of the first indication or the second indication at least in part by transmitting, to the first device, the first indication to preempt receiving the first sidelink communications or to cancel transmitting the first sidelink communications in the first resources.

20. The apparatus of claim 18, wherein the one or more processors are configured to schedule the second device to transmit in the second resources at least in part by scheduling the second device to transmit high priority sidelink transmissions, and wherein the one or more processors are configured to transmit at least one of the first indication or the second indication at least in part by transmitting, to the first device, the first indication to preempt receiving the first sidelink communications or to cancel transmitting the first sidelink communications in the first resources.

21. The apparatus of claim 18, wherein the one or more processors are configured to schedule the first device to communicate in the first resources at least in part by scheduling the first device to transmit high priority sidelink transmissions, and wherein the one or more processors are configured to transmit at least one of the first indication or the second indication at least in part by transmitting, to the second device, the second indication to cancel transmitting uplink communications in the second resources.

22. The apparatus of claim 18, wherein the one or more processors are configured to schedule the first device to communicate in the first resources based at least in part on receiving, from the first device, a high priority sidelink scheduling request.

23. The apparatus of claim 18, wherein the one or more processors are configured to schedule the first device to communicate in the first resources based at least in part on receiving, from the first device, a buffer status report for the first sidelink communications.

24. The apparatus of claim 18, wherein the one or more processors are configured to transmit at least one of the first indication or the second indication based on a level of interference related to at least the first device and the second device.

25. The apparatus of claim 24, wherein the one or more processors are configured to:
generate an interference graph based at least in part on at least one of receiving, from the first device, signal measurements of signals received from the second device as measured at the first device or receiving, from the second device, signal measurements of signals received from the first device as measured at the second device; and
determine the level of interference based on the interference graph that indicates the level of interference between the first device and the second device.

26. The apparatus of claim 18, wherein the one or more processors are configured to transmit at least one of the first indication or the second indication further based on determining that the first resources and the second resources overlap in frequency or are subject to cross-frequency interference.

27. An apparatus for wireless communication, comprising:
a transceiver;
a memory configured to store instructions; and
one or more processors communicatively coupled with the memory and the transceiver, wherein the one or more processors are configured to:
transmit, to a base station, a first indication of interference from a second UE, wherein the first indication of interference identifies a beam over which the interference from the second UE occurs;
receive, from the base station, based on transmitting the first indication of interference to the base station, and based on a second beam configured for a second UE for transmitting sidelink or uplink communications in second resources causing interference to a first beam configured for the apparatus in sidelink resources, a second indication to cancel sidelink transmission over sidelink resources, wherein the sidelink resources are previously scheduled for the sidelink transmission; and
refrain, based on the second indication, from the sidelink transmission over the sidelink resources.

28. The apparatus of claim 27, wherein the one or more processors are further configured to transmit, based on the first indication to cancel sidelink transmission and to one or more UEs, a third indication to preempt receiving the sidelink transmission over the sidelink resources.

* * * * *